(12) United States Patent
Kluth

(10) Patent No.: US 6,369,966 B2
(45) Date of Patent: Apr. 9, 2002

(54) STANDBY SIGNAL FOR AUDIO FM DEMODULATOR

(75) Inventor: Hans-Jürgen Kluth, Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/205,525

(22) Filed: Dec. 3, 1998

(30) Foreign Application Priority Data

Dec. 22, 1997 (DE) .......................... 197 57 315

(51) Int. Cl.[7] .............................................. G11B 20/06
(52) U.S. Cl. ............................ 360/30; 360/64; 386/47; 386/100
(58) Field of Search .............................. 306/30, 64, 61, 306/281; 386/2, 3, 21, 47, 100, 113

(56) References Cited

U.S. PATENT DOCUMENTS

| | | | |
|---|---|---|---|
| 4,203,134 A | 5/1980 | Christopher et al. | 358/128.5 |
| 4,455,580 A | 6/1984 | Kluth | 360/19.1 |
| 4,464,684 A | 8/1984 | Kluth | 358/310 |
| 4,862,299 A | 8/1989 | Hagita | 360/64 |
| 5,111,346 A * | 5/1992 | Matsuoka | 360/64 |

FOREIGN PATENT DOCUMENTS

| | | | | |
|---|---|---|---|---|
| DE | 2939402 | * | 4/1980 | |
| DE | 3110968 A | * | 9/1982 | |
| DE | 3233479 A1 | | 9/1982 | H04N/5/92 |
| DE | 3125878 A1 | | 1/1983 | H04N/5/92 |
| DE | 3125879 A | * | 1/1983 | |
| EP | 0-068-188 B1 | * | 8/1982 | 360/30 |
| GB | 2141572 A | | 12/1984 | G11B/5/04 |
| JP | 59-107404 | | 6/1984 | H04N/5/92 |

* cited by examiner

Primary Examiner—Alan T. Faber
(74) Attorney, Agent, or Firm—Joseph S. Tripoli; Kuniyuki Akiyama

(57) ABSTRACT

In order to reproduce the audio signal which has been recorded as an FM audio signal in the slanted tracks of a recording medium in tape form by means of read/write heads arranged on a rotating head drum, it is possible to use PLL circuits which are designed as FM demodulators and in each case form a phase-locked loop with a VCO. FM demodulators of this type generally operate satisfactorily e.g. in video recorders with improved audio signal recording, but there is the risk of the frequency of the VCO of the respective FM demodulator drifting when the read/write head assigned to it leaves the wrap-around region of the recording medium on the head drum and only being able to be synchronized with the FM audio signal when the said head re-enters the recording medium. According to the invention, each FM demodulator is supplied with the FM audio signal even when the read/write head assigned to it leaves the wrap-around region of the recording medium on the head drum, by the respective FM demodulator being fed the audio signal which is read by the respective other read/write head.

14 Claims, 2 Drawing Sheets

STANDBY SIGNAL FOR AUDIO FM DEMODULATOR

BACKGROUND OF THE INVENTION

The invention relates to a method for the reproduction of an audio signal recorded according to the helical scan method. The invention furthermore relates to a recorder for the reproduction of an audio signal recorded according to the helical method. In particular, the invention is based on a video recorder with improved signal recording.

The improved audio signal recording e.g. in accordance with the VHS standard is based on the recording of two sound carriers, which are frequency-modulated with the respective audio signal and called FM audio signal in the following text, in the slanted tracks of the recording medium in tape form.

A video recorder of this type is disclosed e.g. by EP-0-068-188 B1. The respective changeover, necessary in the reproduction mode, between the signal paths of the two read/write heads arranged on a head drum, which are also called channel I and II, is effected in that document in each case in the path of the demodulated FM audio signals at a point in time at which both read/write heads supply an uninterrupted sound carrier on account of partially overlapping recording, two FM demodulators being used for each rotating read/write head for the purpose of demodulation, with the result that the FM demodulators of the two read/write heads can output an uninterrupted audio signal in the overlap region.

For the demodulation of FM audio signals in contemporary video recorders with improved audio signal recording, voltage-controlled oscillators each with a PLL circuit are usually used. For this purpose, the respective PLL circuit forming a phase-locked loop receives, on the one hand, the FM audio signals scanned by the read/write head assigned to it and, on the other hand, the signal from its voltage-controlled oscillator, called VCO in the following text, which is in this case synchronized with the FM audio signal corresponding to its frequency in that the regulating voltage which is produced at the output of the PLL circuit and simultaneously forms the demodulated audio signal controls the VCO.

SUMMARY OF THE INVENTION

An object of the invention is to specify an improved method for the interaction of such FM demodulators, used in particular for improved audio signal recording, with the rotating read/write heads.

The object is achieved by means of the method disclosed in this application. Advantageous developments of the invention are specified in the respective subclaims.

A further object of the invention is to provide a recorder in which such FM demodulators, used in particular for improved audio signal recording, interact better with the rotating read/write heads.

This object is achieved by means of the recorder disclosed in this application. Advantageous developments of the invention are specified in the respective subclaims.

The invention is based on the following insights and considerations:

Whenever one of the two rotating read/write heads in the reproduction mode leaves the wrap-around region of the recording medium in tape form on the periphery of the head drum, the FM demodulators assigned to this read/write head do not receive a signal until the said head re-enters the recording medium (that is to say until the said head re-engages with the recording medium), with the result that the respective phase-locked loop is interrupted in each case for a corresponding period. FM demodulators of this type generally operate satisfactorily in video recorders with improved audio signal recording. However, given such an interruption, there is the risk of the frequency of the VCO of the respective FM demodulator drifting and only being able to be regulated to the desired value and/or synchronized with the FM audio signal assigned to it when the corresponding read/write head re-enters the recording medium.

The idea of the invention, therefore, is for the FM demodulators of the respective read/write head which is currently not located in the wrap-around region to be fed the respective signal scanned by the other read/write head, with the result that the period of interruption of the respective phase-locked loop is shortened.

This has the advantage that the VCOs used in particular for the purpose of demodulating FM audio signals in a video recorder can be synchronized in good time with the corresponding FM audio signals.

According to the invention, provision may also be made for feeding to the respective FM demodulators of the read/write head (or to the respective FM demodulator of the read/write head in the case of a recorder in which the respective changeover between the signal paths of the two read/write heads is performed prior to the demodulation of the FM audio signals) which is not currently located in the wrap-around region, in each case for the entire duration of its movement outside the wrap-around region, the FM audio signal which is scanned by the other read/write head, with the result that an interruption of the phase-locked loops practically never occurs.

In an advantageous manner, the FM demodulators can be utilized as modulators for improved recording of the audio signal.

BRIEF DESCRIPTION OF THE DRAWINGS

The invention is explained in more detail below using an exemplary embodiment. In the figures.

DETAILED DESCRIPTION OF THE PREFERRED EMBODIMENTS

Figure 1:
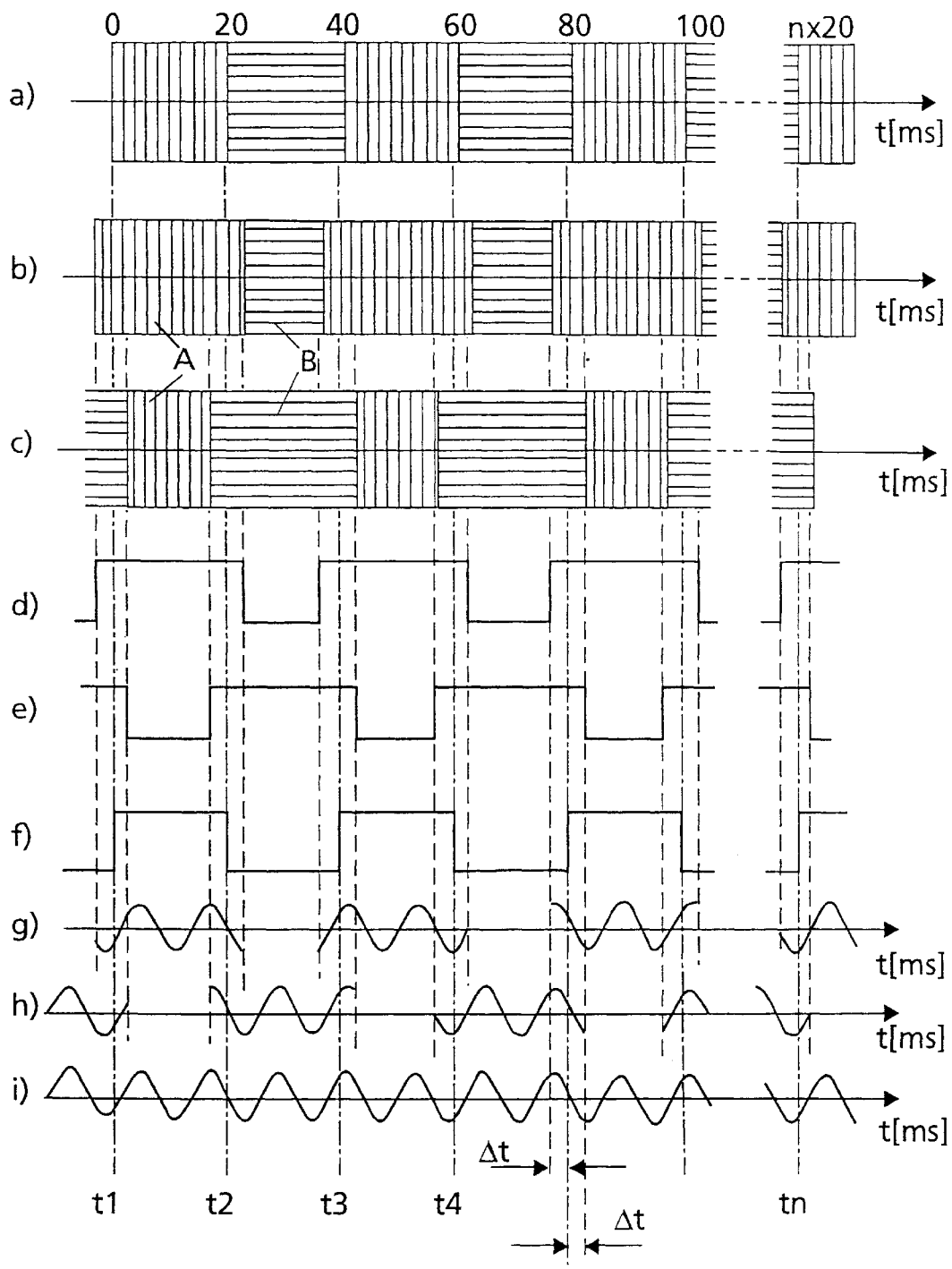
FIG. 1 shows diagrams for elucidating the audio signal processing in accordance with the present invention in a video recorder with improved audio signal recording.

FIG. 1 illustrates diagrams a)–i) of signals as a function of the time t which signals occur in the reproduction mode in accordance with the present invention in a video recorder which operates according to the helical scan method with improved recording of the audio signal.

In this case, diagram a) shows the modulated vision carrier at the output of a changeover switch known per se (not shown) for successive fields having a duration of 20 ms, for example. In the reproduction mode, the modulated vision carrier is fed from this changeover switch to the signal paths in order to obtain the video signal.

Diagrams b)–i) relate to the processing of the audio signal recorded in the slanted tracks of a recording medium in tape form (not illustrated). The audio signal may involve stereo sound or 2-channel which, for the purpose of its recording e.g. in accordance with the VHS standard, is modulated onto a first radio-frequency sound carrier of e.g. 1.4 MHz and also a second radio-frequency sound carrier corresponding to 1.8 MHz.

Figure 2:
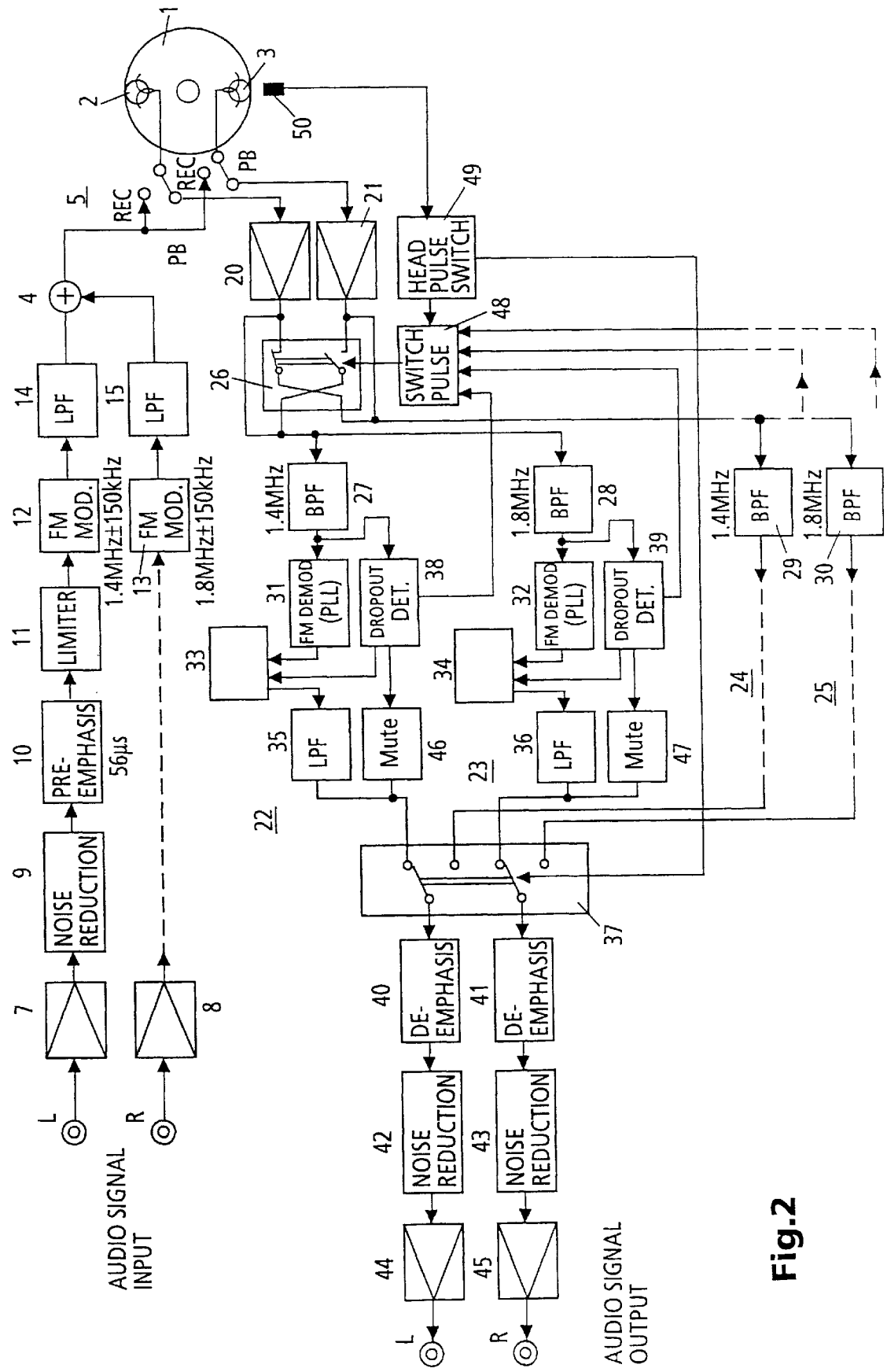
FIG. 2 shows a block diagram with the audio signal processing in the reproduction mode in accordance with the present invention in a video recorder with improved audio signal recording.

FIG. 2 illustrates a block diagram for the processing of the audio signal in the video recorder according to the invention. Two read/write heads 2, 3 arranged on a rotating head drum 1 are provided for the recording and reproduction of the audio signal.

The recording is effected in a manner known per se using known means in that the audio signal is fed into the respective input L, R of two identical circuit arrangements in parallel with one another, whose respective output is connected via an addition stage 4 and a recording mode/reproduction mode changeover switch 5 to the read/write heads, 2, 3. For the sake of simplicity, only the circuit arrangement connected to the audio signal input L is illustrated in its entirety. In principle, each of the two circuit arrangements comprises an amplifier 7, 8, which forms the input, a noise reduction stage 9, a pre-emphasis stage 10, a limiter 11 and an FM modulator 12, 13, from the output of which the sound carrier which is modulated with the audio signal and called FM audio signal in the following text is fed via a low-pass filter 14, 15 to the addition stage 4. The switch position of the changeover switch 5 shows the reproduction operating mode.

In accordance with the selected exemplary embodiment, the respective changeover, which is necessary in the reproduction mode, between the signal paths of the two read/write heads 2, 3 is effected in each case in the path of the demodulated FM audio signals.

Diagrams b) and c) show the respective envelopes of the FM audio signal, read by the read/write heads 2, 3 and amplified by means of head amplifiers 20, 21 at the respective inputs of signal-processing circuit arrangements 22, 23; 24, 25 which are provided in pairs for each read/write head 2, 3, the respective signal feeding to the circuit arrangements 22, 23; 24, 25 being effected on a direct path, on the one hand, and via controllable switch means 26, on the other hand. The respective vertically hatched blocks A in this case represent the envelopes of the FM audio signal scanned by the read/write head 2, while the respective horizontally hatched blocks B represent the envelopes of the FM audio signal scanned by read/write head 3.

The inputs of each pair of such circuit arrangements 22, 23; 24, 25, which practically differ only in respect of the FM audio signal frequency to be processed, are in each case formed by a bandpass filter 27; 29 tuned to the first FM audio signal frequency of 1.4 MHz and by a bandpass filter 28; 30 tuned to the second FM audio signal frequency of 1.8 MHz. From the two pairs of such circuit arrangements 22, 23; 24, 25 provided for each read/write head 2, 3, only the pair assigned to the read/write head 2 is illustrated in its entirety, for the sake of simplicity. Furthermore, each circuit arrangement 22, 23, 24, 25 contains, in the further course of the audio signal path, a PLL circuit, designed as FM demodulator 31, 32 in a manner known per se, with a VCO for the purpose of FM audio signal demodulation, a delay line with e.g. a sample & hold circuit 33, 34, controlled by a dropout detector 38, 39, for the purpose of dropout compensation and a low-pass filter 35, 36, whose output is connected to a changeover switch 37 which is provided for the respective changeover, effected in the reproduction mode, between the signal paths of the two read/write heads 2, 3 in the path of the demodulated FM audio signal. The demodulated audio signal passes in a known manner from the changeover switch 37 via two paths in parallel with one another and each having a series circuit formed by a deemphasis circuit 40, 41, a noise reduction stage 42, 43 and an amplifier 44, 45 e.g. as stereo sound, 2-channel sound or—as illustrated in diagram i)—mono sound to the audio signal outputs L and R. Diagrams g and h show the signal component of the respective read/write head 2, 3.

The dropout detector 38, 39 of the respective circuit arrangement 22, 23, 24, 25 is in each case connected to the output of one of the bandpass filters 27, 28, 29, 30 tuned to the FM audio signal frequencies of 1.4 MHz or 1.8 MHz. The dropout detector 38, 39 of the respective circuit arrangement 22, 23, 24, 25 furthermore serves for controlling a mute circuit 46, 47, which is provided in each circuit arrangement 22, 23, 24, 25 for the purpose of muting the audio signal path in the event of dropouts of relatively long duration and is connected for this purpose to the output of the low-pass filter 35, 36.

According to the invention, the dropout detector 38, 39 of each circuit arrangement 22, 23, 24, 25 has a control signal output which is connected to a control input, assigned to it, of a generator 48 that generates switching signals.

The switching signals, which are provided for the purpose of controlling the switch means 26 already mentioned and whose respective time profile is illustrated in diagrams d and e, can advantageously be derived e.g. from the head changeover signal in that the head changeover signal is fed to the generator 48 via a further control input and is logically combined with the control signal of the dropout detector 38, 39 of each circuit arrangement 22, 23, 24, 25 which is fed to the generator 48. The respective control signal fed to the generator 48 can assume the logic value 1 or 0, like the head changeover signal. The effect of the logic combination, which can be effected e.g. in a simple manner by means of corresponding arrangements of AND gates, is that the switch means 26 are actuated whenever the respective dropout detectors 38, 39 assigned to a read/write head 2, 3 detect that the latter leaves the wrap-around region of the recording medium on the head drum 1. The respective illustrated switch position of the switch means 26 corresponds to the position in which the read/write head 3 moves outside the wrap-around region of the recording medium on the head drum 1.

Instead of the head changeover signal, the signal which is used as a reference for the respective phase angle of the rotating head drum 1 and, as is known, is obtained by means of a sensor designed as a position sensor can also be utilized in the same way for deriving the switching signals.

The head changeover signal, which controls the switch 37 for the respective changeover, performed in the reproduction mode, between the signal paths of the two read/write heads 2, 3 in the path of the demodulated FM audio signal, is generated in a known manner by a generator 49 designed e.g. as a multivibrator, for which purpose the signal which is used as a reference for the respective phase angle of the rotating head drum 1 is fed to the said generator. The time profile of the head changeover signal is illustrated in diagram f).

A circuit according to the block diagram for the reproduction mode as described thus far operates as follows:

As is illustrated in diagrams b) and c), according to the invention each pair of circuit arrangements 22, 23; 24, 25 receives, preferably in each case for the entire duration of the movement of its read/write head 2; 3, assigned to it, outside the wrap-around region of the recording medium on the head drum 1, the FM audio signal scanned by the other read/write head 3; 2. The respective duration of the movement of the read/write heads 2, 3 outside the wrap-around region of the recording medium, in this case differs from the duration of the abovementioned changeover of successive fields by two identical absolute time values Δt, which practically correspond to the respective overlap region at the beginning and at the end of the recorded tracks.

This ensures that the FM demodulators 31, 32 of the pair of circuit arrangements 22, 23; 24, 25 are still supplied with the FM audio signal even when the read/write head 2; 3 assigned to them for the reproduction leaves the wrap-around region of the recording medium on the head drum 1, with the result that an interruption of the phase-locked loop, formed by a PLL circuit, of the respective FM demodulators practically never occurs.

What remains unaffected by this—as illustrated by diagrams a), f), g), h) and i)—is the respective instant t1–tn of the changeover which relates to the audio signal and is preferably effected in each case in the path of the demodulated audio signal and, in respect of the instant, is practically identical to the respective changeover of successive fields.

Although the invention has been described with reference to the supply of FM demodulators provided in pairs for each audio channel and/or read/write head, it can also equally well be applied to recorders in which the respective changeover, necessary in the reproduction mode, between the signal paths of the read/write heads is in each case effected actually prior to the demodulation of the FM audio signals and, consequently, has only one PLL circuit, designed as FM demodulator, for each read/write head.

For improved recording of the audio signal, provision may be made for utilizing the FM demodulators as modulators for the modulation of the respective carrier signal by the audio signal.

Furthermore, in a different exemplary embodiment, provision may be made for deriving the switching signals for the control of the switch means 26 in accordance with diagrams d) and e) from the head changeover signal in a different manner, by using the head changeover signal to trigger e.g. a stable multivibrators in a correspondingly time-delayed manner.

I claim:

1. A method of reproducing an audio signal which is recorded on a recording medium as an FM audio signal by frequency modulating one or more carrier signals using read/write heads, said read/write heads being arranged on a rotating head drum, said read/write heads are correspondingly alternately changed over during reproduction mode whereby after demodulation of the FM audio signal a change over switch is correspondingly controlled by means of a head changeover signal, said method comprising the steps of:

reading the FM audio signal from the recording medium by means of said read/write heads, each of said read/write heads being assigned to a head amplifier and, according to a number of said one or more carrier signals for recording the audio signal on the recording medium, to one or more circuit arrangements each including one FM demodulator for FM audio signal demodulation;

amplifying the FM audio signal by the head amplifier of the respective read/write head to generate an amplified FM audio signal;

feeding the amplified FM audio signal directly and via controllable switch means to corresponding inputs of the circuit arrangements for demodulating the FM audio signal, said controllable switch means are thereby controlled by means of switching signals in such a way that each circuit arrangement of each read/write head is respectively supplied with the amplified FM audio signal read by the other read/write head when one of the read/write heads moves out of contact with the recording medium while the respective other one is scanning the recording medium;

demodulating the amplified FM audio signal by means of the FM demodulator of each circuit arrangement of the respective read/write head to generate a demodulated FM audio signal; and feeding the demodulated FM audio signal outputted from each circuit arrangement of the respective read/write head to the changeover switch to alternately connect, by controlling the changeover switch by means of the head changeover signal, each circuit arrangement of the respective read/write head to a series circuit formed by a de-emphasis circuit, a noise reduction stage and an amplifier for outputting the audio signal.

2. The method according to claim 1, further comprising the step of deriving the switching signals from the head changeover signal and from control signals outputted from dropout detectors which are provided in said circuit arrangements for the purpose of audio signal path muting in the event of dropouts, said switching signals being derived to control the switch means so that each said circuit arrangement of each said read/write head is respectively supplied with the FM audio signal read by the other read/write head when one of said read/write heads moves out of contact with the recording medium while the respective other one is scanning the recording medium.

3. The method according to claim 2 further comprising the step of generating said switching signals by a generator by means of logically combining the head changeover signal and the control signals outputted from the dropout detectors.

4. The method according to claim 3 further comprising the step of effecting the logic combination of the head changeover signal and the control signals from the dropout detectors by means of corresponding circuit arrangements of AND gates.

5. The method according to claim 1 further comprising the step of deriving the switching signals from a sensor designed as a position sensor for the respective phase angle of the rotating drum and from said control signals outputted from dropout detectors which are provided in said circuit arrangements for the purpose of audio signal path muting in the event of dropouts, said switching signals being derived in order to control the switch means so that each circuit arrangement of each read/write head is respectively supplied with the FM audio signal read by the other read/write head when one of the read/write heads moves out of contact with the recording medium while the respective other one is scanning the recording medium.

6. The method according to claim 5 further comprising the step of generating said switching signals by a generator by means of logically combining a signal from the sensor designed as a position sensor for the respective phase angle of the rotating drum and the control signals from the dropout detectors.

7. The method according to claim 5, further comprising the step of effecting the logic combination of the signal from the sensor designed as a position sensor for the respective phase angle of the rotating drum and the control signals outputted from the dropout detectors by means of circuit arrangements of AND gates.

8. A device for reproducing an audio signal which is recorded on a recording medium as an FM audio signal by frequency modulating one or more carrier signals, said device comprising:

read/write heads arranged on a rotating head drum and correspondingly alternately changed over during reproduction mode by means of a head changeover signal after demodulation of the FM audio signal, each of said read/write heads is assigned to a head amplifier generating an amplified FM audio signal and, according to the number of carrier signals for recording the audio signal on the recording medium, to one or more circuit arrangements each including one FM demodulator to generate a demodulated FM audio signal by demodulating the amplified FM audio signal;

controllable switch means arranged between output of the head amplifiers and input of the circuit arrangements, said controllable switch means are provided for supplying each circuit arrangement of each read/write head with the amplified FM audio signal read by the other read/write head when one of the read/write heads moves out of contact with the recording medium while the respective other one is scanning the recording medium whereby said controllable switch means are accordingly controlled by means of switching signals; and a changeover switch which is supplied with the demodulated FM audio signal outputted from each circuit arrangement of the respective read/write head, by controlling said changeover switch by means of the head changeover signal each circuit arrangement of the respective read/write head is alternately connected to a series circuit formed by a de-emphasis circuit, a noise reduction stage and an amplifier for outputting the audio signal.

9. The device according to claim 8, wherein the switching signals are derived from the head changeover signal and from control signals outputted from dropout detectors which are provided in said circuit arrangements for the purpose of audio signal path muting in the event of dropouts so as to control the switch means so that each said circuit arrangement of each said read/write head is respectively supplied with the FM audio signal read by the other read/write head when one of said read/write heads moves out of contact with the recording medium while the respective other one is scanning the recording medium.

10. The device according to claim 9, wherein said switching signals are generated by a generator by means of logically combining the head changeover signal and the control signals outputted from the dropout detectors.

11. The device according to claim 10, wherein the logic combination of the head changeover signal and the control signals from the dropout detectors is effected by means of corresponding circuit arrangements of AND gates.

12. The device according to claim 8, wherein the switching signals are derived from a sensor designed as a position sensor for the respective phase angle of the rotating drum and from control signals outputted so as to control the switch means so that each circuit arrangement of each said read/write head is respectively supplied with the FM audio signal read by the other read/write head when one of the read/write heads moves out of contact with the recording medium while the respective other one is scanning the recording medium, from dropout detectors which are provided in said circuit arrangements for the purpose of audio signal path muting in the event of dropouts.

13. The device according to claim 12, wherein said switching signals are generated by a generator by means of logically combining a signal from the sensor designed as a position sensor for the respective phase angle of the rotating drum and the control signals from the dropout detectors.

14. The device according to claim 13, wherein the logic combination of the signal from the sensor designed as a position sensor for the respective phase angle of the rotating drum and the control signals outputted from the dropout detectors is effected by means of circuit arrangements of AND gates.

* * * * *